Jan. 2, 1951 K. COHEN ET AL 2,536,423
CENTRIFUGE FOR SEPARATING GAS MIXTURES
Filed Jan. 31, 1945 4 Sheets-Sheet 1

INVENTOR
HAROLD C. UREY
KARL COHEN
BY
Robert A. Lavender
ATTORNEY

Jan. 2, 1951    K. COHEN ET AL    2,536,423
CENTRIFUGE FOR SEPARATING GAS MIXTURES
Filed Jan. 31, 1945    4 Sheets-Sheet 4

INVENTORS.
HAROLD C. UREY
KARL COHEN
BY

Patented Jan. 2, 1951

2,536,423

UNITED STATES PATENT OFFICE 2,536,423

CENTRIFUGE FOR SEPARATING GAS MIXTURES

Karl Cohen, New York, N. Y., and Harold C. Urey, Leonia, N. J., assignors to University Patents, Inc., a corporation of New York Application January 31, 1945, Serial No. 575,532

5 Claims. (Cl. 233—28)

This invention relates to centrifugal separators and more particularly to a novel method and apparatus for improving the efficiency of a tubular, high speed centrifuge in separating fluid mixtures. The method and apparatus of the present invention are particularly well adapted for use in the continuous separation of gaseous mixtures, such as, for example, isotopic gaseous mixtures and will be described as applied to this relatively complex problem. However as the description proceeds it will become apparent that the method and apparatus may also be applied with advantage to the relatively simpler problem of separating non-gaseous mixtures such as liquid dispersions and suspensions.

It is now well-established that most of the chemical elements as they occur naturally consist of mixtures of different species called isotopes, and that the isotopes of an element possess substantially identical chemical properties but differ from one another in atomic mass. Many of these isotopes possess interesting and useful properties, and in recent years there has been an increasing interest in methods for effecting a separation of such isotopes either by separating the isotopes of an element directly or by forming a compound of the element and separating the different isotopic species of the compound. Because of the chemical identity of the isotopes and the relatively small difference in their atomic masses, the problem of separation is an exceedingly difficult one.

Various methods of separation have been considered and examined. Since difference in mass is one of the most significant differences between the isotopes of an element, centrifugal separation in a continuous high speed centrifuge is a method of separation that, in theory, may be used with advantage. Considerable work has been done toward developing a satisfactory method and apparatus for effecting such a centrifugal separation, but so far as we are aware all of the previously proposed methods are subject to one or more disadvantages as set forth hereinafter.

According to one previous proposal, an isotopic mixture in the form of a volatile liquid is placed in one end of the rotor bowl of a vertically arranged centrifuge, the centrifuge is rotated at high speed and vapor is withdrawn from the centrifuge rotor at a point near its axis of rotation. Since the heavier constituent of the vapor tends to concentrate at the periphery of the centrifuge the vapor near the axis will be enriched with respect to the lighter constituent. Thus by withdrawing vapor near the axis of the centrifuge a partial separation of the vapor may be effected and if such a partial separation is repeated a sufficient number of times it should be possible eventually to obtain substantially pure light constituent.

In accordance with another proposal, an isotopic gaseous mixture is fed continuously into one end of the rotor of a centrifuge either at the axis or the periphery of the centrifuge bowl and two fractions of the mixture are withdrawn from the other end of the centrifuge bowl, one near the axis and the other near the periphery of the bowl. In this case the peripheral fraction is enriched with respect to the heavy constituent of the mixture and the axial fraction is enriched with respect to the light constituent. A number of such centrifuges may be interconnected in a so-called "cascade" in such manner that the heavy fractions move toward the bottom of the cascade and the light fractions toward the top of the cascade, thus bringing about the separation of the isotopes.

It should be noted that in both of these proposals there is an appreciable amount of transverse mass flow of the gaseous mixture which tends to cause undesired mixing of the components of the mixture. In the second case, for example, if the gas enters at the axis of the centrifuge, a part of the gas flows radially outward to the periphery to be withdrawn from the periphery at the other end of the centrifuge or if the gas is admitted at the periphery of the centrifuge bowl, a fraction of the gas flows radially inward to the axis to be withdrawn near the other end of the axis of the centrifuge bowl. Gas that flows radially outward in the rotor of a centrifuge is compressed adiabatically and thereby heated and gas that flows radially inward toward the axis of the rotor expands adiabatically and is thereby cooled. Thus transverse mass flow of the gaseous mixture not only produces mixing in itself but also produces thermal effects that tend to cause mixing of the gas within the centrifuge, thereby reducing the efficiency of separation. Since the amount of separation that can be obtained in a single pass through the centrifuge is under the most favorable circumstances very small, it is important that the conditions of operation of the centrifuge be such as to give a relatively high efficiency.

It is an object of the present invention to provide a method and apparatus for more efficiently separately the components of a fluid mixture.

It is another object of the invention to provide a centrifuge for separating gaseous mixtures wherein a definite flow pattern is established and maintained within the centrifuge.

It is a further object of the invention to provide a method and apparatus for centrifugal separation of gases wherein the gaseous mixture passes through the centrifuge in two well-defined relatively thin streams.

It is still another object of the invention to provide a centrifugal separator for separating a gaseous mixture wherein the streams of gas flowing through the centrifuge are spaced from the axis of the centrifuge at such distances as to produce the most efficient separation of the components of the gaseous mixture and radial mass flow within the centrifuge is eliminated.

It is a still further object of the invention to provide a centrifugal separator of the above type that is of generally conventional construction and substantially no more complex and expensive than the centrifugal separators previously proposed.

Other objects of the invention will be in part obvious and in part pointed out hereinafter.

In one of its broader aspects, the present invention comprises a method of separating the components of the gaseous mixture by passing the gas mixture through a centrifuge in such manner as to establish a well-defined flow pattern characterized by the fact that the gas mixture flows through a centrifuge in an axial direction and that transverse mass flow of the gas mixture is substantially eliminated. According to one pattern that has been shown to produce highly efficient separation of a gaseous mixture, the mixture is caused to flow through the centrifuge rotor in two cylindrical thin streams, one stream being located at or near the periphery of the centrifuge bowl and the other stream being located between the peripheral stream and the axis of rotation of the centrifuge. The operation of the centrifuge may be such that the two streams flow either concurrently or countercurrently. Under such circumstances when the centrifuge is rotated at high speed, the lighter component tends to diffuse from the peripheral stream to the inner stream and the heavy constituent tends to diffuse from the inner stream to the peripheral stream. By properly positioning the inlet and outlet ports for the two streams, transverse flow may be limited to the diffusive flow between the two streams and mass flow with the undesired mixing that it produces may be substantially eliminated. By using a flow pattern of this type, no net flow of gas toward or away from the axis of rotation takes place and hence heating and cooling effects within the centrifuge bowl may be substantially eliminated. Thus a principal cause of undesired mixing is removed and the separating efficiency of the centrifuge materially increased. The centrifugal field exercises a stabilizing influence and tends to maintain the gas flow in the particular pattern that has been established. The gas other than that in the two streams is stagnant; that is to say, it rotates with the centrifuge but does not move in an axial or radial direction. This gas, being stagnant, permits diffusive flow of light molecules to the inner stream and of heavy molecules to the outer stream, while at the same time transverse mass flow is substantially eliminated. The undesirable effects of such mass flow have already been discussed.

We have found that it is important in operating with such a flow pattern that the inner stream be appreciably spaced from the axis of the centrifuge and that there is a critical spacing which produces most efficient separation of the components of the mixture. A brief discussion of the theory of the operation of a gas separating centrifuge will be of assistance in indicating how the optimum position of the inner stream may be arrived at. In the following discussion it will be assumed that the centrifuge is of the so-called "flow-through" type and that the gas passes through the centrifuge in two thin cylindrical streams, one located at the periphery of the centrifuge, which is a distance $r_2$ from the axis of rotation, and the other located at a point between the axis and periphery, which is a distance $r_1$ from the axis. Under the influence of centrifugal force molecules of the heavier gas tend to diffuse from the inner to the outer stream and molecules of the lighter gas from the outer to the inner stream.

It is evident that the rate of flow of gas through the centrifuge will have an important bearing on the extent to which separation takes place. Assume first that the ratio $r_1/r_2$ is maintained constant. Then if the flow through the centrifuge is zero, an equilibrium condition will eventually be established such that there is a maximum difference of composition between the inner and outer streams for a given ratio of $r_1/r_2$, and zero transfer of material between the two streams. As the flow increases the difference in composition between the two streams will decrease and the rate of transfer of material between the two streams will increase. These two opposing factors may be balanced to give an optimum rate of throughput.

Assume next that the flow is maintained constant and the ratio $r_1/r_2$ varied. As this ratio approaches zero, i. e. as the inner stream approaches the axis, the composition difference between the inner and outer streams will increase. However the rate of diffusion of gas into and out of the inner stream depends upon the cylindrical area of the stream i. e. the area available for diffusion of gas into and out of the stream. Therefore as the inner stream is positioned closer to the axis the transfer of material between the streams will decrease. Similarly, as the ratio $r_1/r_2$ approaches 1, the composition difference between the streams will approach zero and the area of the inner stream available for diffusion will approach a maximum. We have found that there is an intermediate value of the ratio $r_1/r_2$ which will produce the greatest overall separation.

When a number of centrifuges are arranged in a cascade some of the foregoing statements require qualification. Optimum conditions of operation for individual centrifuges do not necessarily insure either a maximum separation for a given number of centrifuges arranged in a cascade or the attainment of a given separation with a minimum number of centrifuges. It has been determined that in order to effect a given separation with a minimum number of centrifuges it is necessary that the following expression, sometimes called separative work, be a maximum:

$$(S-1)^2 F$$

In this expression S is a factor indicative of the difference in composition between the exit streams of gas and F is a factor indicative of the transfer or transport of material between the streams. For isothermal operation of the centrifuge, the factors S and F are related to the radii $r_1$ and $r_2$ in the following manner:

$$S = e^{\frac{\Delta M \omega^2 r_2^2}{2RT}\left[1 - \frac{r_1^2}{r_2^2}\right]}$$

$$F = \frac{K}{-\log \frac{r_1^2}{r_2^2}}$$

wherein $\Delta M$ = the difference in molar mass of the two components of the gaseous mixture
$\omega$ = the angular velocity of the centrifuge
$R$ = the gas constant
$T$ = the absolute temperature and
$K$ = a constant that is independent of the values of $r_1$ and $r_2$ It has been found that for isothermal operation the values of the ratio $r_1/r_2$ should be about .53 to maximize the expression $(S-1)^2 F$, and that this is the optimum value of the ratio for isothermal operation.

However, where there is a radial temperature gradient within the centrifuge the optimum value of the ratio may depart substantially from this value, and may vary from 0.4 to 0.6. Thus if there is a temperature gradient that increases from the axis to the periphery of the centrifuge the optimum value of the ratio may fall as low as 0.40 to 0.43. Conversely, if there is a temperature gradient that increases from the periphery to the axis, the optimum value of the ratio may be as high as 0.57 to 0.60.

It has been found that the optimum ratio of radii of the two streams is largely independent of the character of the gas being separated and has the same value for concurrent and countercurrent flow of the streams.

The method of the invention may be more fully understood by reference to the accompanying drawings which illustrate apparatus capable of carrying out the method of the invention and wherein.

Figure 1:
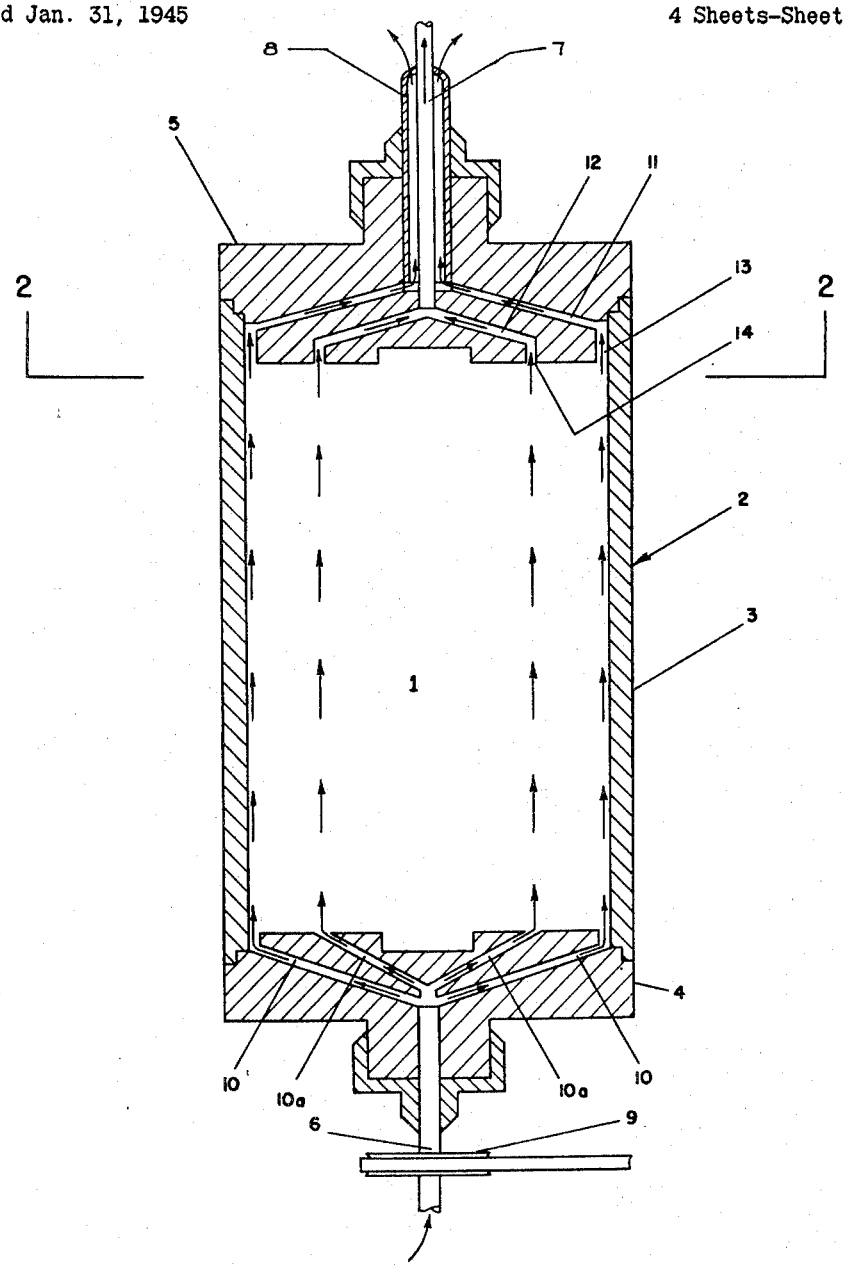
Fig. 1 is a sectional view taken vertically through one form of centrifugal separator embodying the present invention.

Referring now to the drawings, Fig. 1 discloses one embodiment of a centrifugal separator of the continuous flow-through type comprising a separating chamber 1 enclosed by a rotor 2 that may include a tubular wall member 3 having inlet and outlet end caps 4 and 5, respectively, secured to the opposite ends thereof. A tubular shaft 6 is secured axially in the inlet end cap 4 of the rotor. Similarly secured in the outlet end cap 5, in alignment with the shaft 6, are a pair of concentrically spaced coaxially arranged tubular shafts 7 and 8, respectively. The aligned tubular shafts 6 and 7 rotationally support the centrifuge rotor 2 and these, together with shaft 8, also constitute the inlet and outlets, respectively, to the rotor chamber 1. The rotor 2 may be driven rotationally from any suitable source of power, for example, by means of a belt that drives a pulley 9 secured upon the shaft 6.

As shown in the drawings, the construction of the inlet end cap 4 is such that the gaseous mixture introduced through the inlet shaft 6 into the rotor 2, enters the separating chamber 1 adjacent the outer peripheral edge thereof, and at points spaced radially inward of the periphery. To this end there is provided in the inlet end cap 4 outer and inner groups of a plurality of radially extending passages 10 and 10a that have their inner end openings in communication with the inner end of the shaft 6 and their outer end openings arranged circumferentially of the rotor chamber 1 at the outer periphery thereof, and spaced radially inwardly from the periphery, respectively.

As previously stated, the gaseous mixture introduced into the rotor chamber 1 through passages 10 and 10a, flows toward the outlet end of the rotor 2 in two thin streams, one adjacent the periphery of the rotor chamber along the surface of the wall member 3, and the other spaced radially inward from the peripheral stream closer to the rotational axis of the rotor 2, and these two streams are withdrawn independently of each other at the outlet end of the rotor 2, in the present instance, through the rotor end cap 5 and the shafts 7 and 8.

To accomplish this, there is provided in the outlet end cap 5 an outer series or group of radially extending passages 11 that have their outer ends opening to an annular orifice 13 that opens to the rotor chamber circumferentially thereof a predetermined distance from the rotational axis of the rotor 2, and an inner series or group of radially extending passages 12 that have their outer ends opening to an annular orifice 14 that opens to the rotor chamber circumferentially thereof a predetermined distance from the rotational axis of the rotor less than the distance of the annular orifice 13 of the first group of passages 11. The inner ends of the passages 11 and 12 communicate with the inner end openings of the tubular shafts 7 and 8, respectively. As indicated above, a particular feature of the present invention resides in the positioning, radially of the outlet end cap 5, of the annular orifices 13 and 14 of the two series or groups of passages 11 and 12, under optimum conditions of rate of gas flow, to produce the most effective conditions of operation of the centrifuge that will result in a maximum useful separative work per unit length of the rotor chamber 1 in the separation of gaseous mixtures and isotopic gaseous mixtures. We have discovered that these results are obtained, under conditions where the rate of flow through the centrifuge is at the optimum value for the particular gases, by positioning the annular orifice 13 of the outer series passages 11 in the end cap 5 at the periphery thereof, or in other words at, or closely adjacent, the interior surface of the rotor wall member 1, and positioning the annular orifice 14 of the inner series of passages 12 circumferentially of the end cap 5 at a distance radially of the rotational axis of the rotor that is approximately from 40% to 60% of the radial distance from said rotational axis to the inner peripheral wall 3 of the rotor.

The particular position of the orifice 14 of the series of passages 12 radially from the rotational axis of the rotor 2 within the stated range of 40% to 60% of the radius of the inner wall of the rotor chamber, with optimum flow as aforesaid is dependent upon the temperature conditions within the rotor chamber 1, and in the case of substantially isothermal operation of the centrifuge, wherein the temperature within the rotor chamber 1 is substantially constant, the optimum separative work per unit of rotor length is obtained by adjusting the rate of flow of the gases to the optimum value and positioning the orifice 14 of the inner series of passages 11 a distance radially from the rotational axis of the rotor that is approximately 53% of the radius of the rotor chamber 1.

However, in instances where operation of the centrifuge is not isothermal and there exists a temperature gradient radially of the rotor chamber 2, the radial position of the orifice of the passages 12 to produce optimum separation at optimum flow may vary between limits that may be as much as from about 40% to 60% of the radius of the rotor chamber 2, and more usually between distances that are from about 45% to 57% of the rotor radius, depending upon the magnitude of the radial temperature gradient and whether or not the temperature increases radially outward, or inward, of the rotor 2. Thus, for example, as the temperature gradient radially outward of the rotor 2 increases, the optimum distance of the orifice of the passages 12 from the rotational axis decreases, and may become as small as 40% to 43% of the radial distance to the inner wall surface of the rotor chamber 1. Conversely, in the case of an inwardly increasing temperature gradient, the optimum distance of the orifice 14 of passages 12 from the rotational axis increases and may become as great as from 57% to 60% of the radial distance to the inner wall surface of the rotor chamber 1.

For the best results, the radial positions of the rotor ends of the outer and inner groups of the inlet passages 10 and 10A, respectively, in the inlet and end cap 4, should correspond to the radial positions of orifices 13 and 14 that lead to the outlet end cap passages 11 and 12, respectively. By so positioning the orifices a definite flow pattern is established and undesirable transverse mass flow of the gas is minimized.

The diameter, or radial width of the orifices 13 and 14 and the flow area of the passages 11 and 12 is not critical, and the only requirement is that they be sufficiently large to permit substantially unimpeded out-flow of the gases from the rotor chamber. Preferably, however, the radial width of the orifice 13 does not exceed about 2% to 2.5% of the radial distance from the rotational axis of the centrifuge to the periphery thereof, and in the case of the orifice 14 the radial width thereof preferably does not exceed about 5% to 6% of the radius of the rotor chamber 1.

The foregoing construction and arrangement of the end cap passage openings to the rotor interior likewise is applicable to centrifugal separators wherein the inner thin stream of the gaseous mixture flows countercurrent to the outer thin stream. Fig. 3 illustrates one form of centrifuge rotor construction that operates on the countercurrent flow principle previously described, and comprises a separation chamber 1a enclosed by a rotor 2a that includes a wall member 3a having end caps 4a and 5a, respectively, secured to opposite ends thereof. As shown, the end caps 4a and 5a are identical in construction are each provided with an outer and an inner series of passages 11a, 12a, 11b, and 12b, respectively, that have their outer ends arranged circumferentially of the end caps and opening to the rotor interior through orifices 13a and 14a disposed in radially spaced relation with respect to one another in the particular positions hereinbefore described with reference to the passages 11 and 12 in the outlet end cap 5 of the form of centrifuge shown in Figs. 1 and 2.

For conducting the streams of the gaseous mixture to and from the end caps 4a and 5a, there is secured axially in the end caps 4a and 5a a pair of concentrically spaced coaxially arranged tubular shafts 7a, 8a and 7b, 8b, respectively, that have their inner ends communicating with the end cap passages 11a, 11b and 12a, 12b, as shown in the drawing, and the centrifuge is rotationally driven from a suitable source of power, for example, by means of a belt that drives pulley 9a secured on the shaft 6a.

Figure 2:
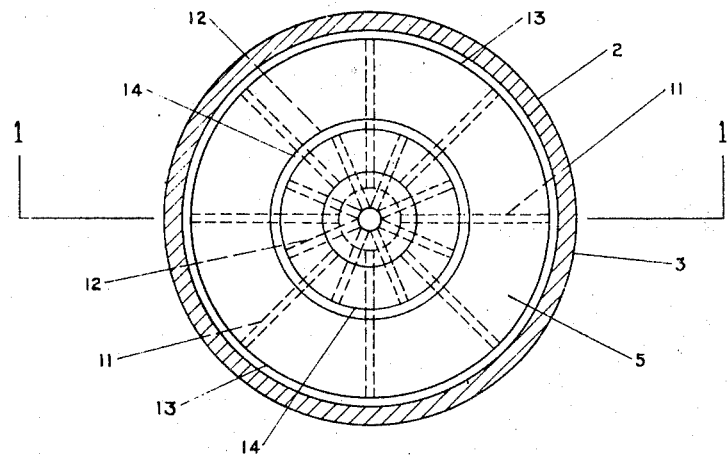
Fig. 2 is a sectional view taken on line 2—2, Fig. 1.
Figure 3:
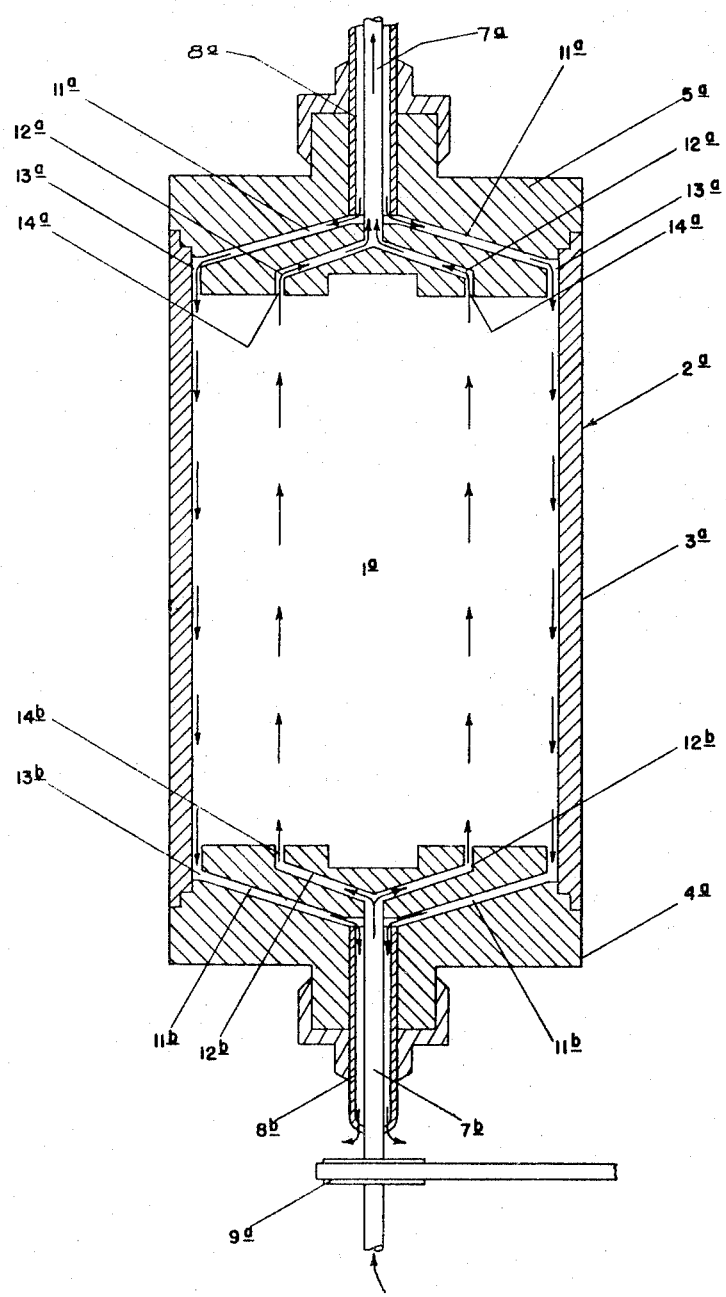
Fig. 3 is a sectional view taken vertically through another form of centrifugal separator embodying the features of the present invention.
Figure 5:
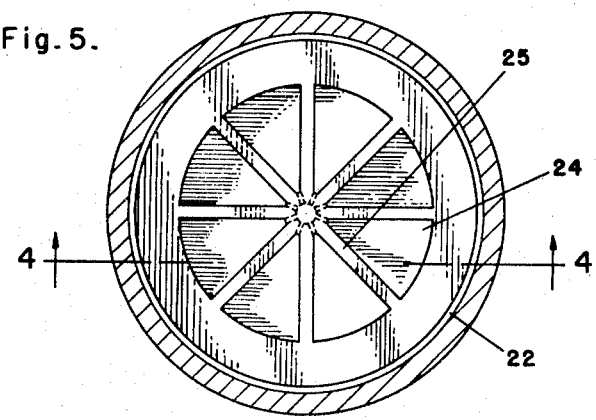
Fig. 5 is a sectional view taken on line 5—5 of Fig. 4.
Figure 4:
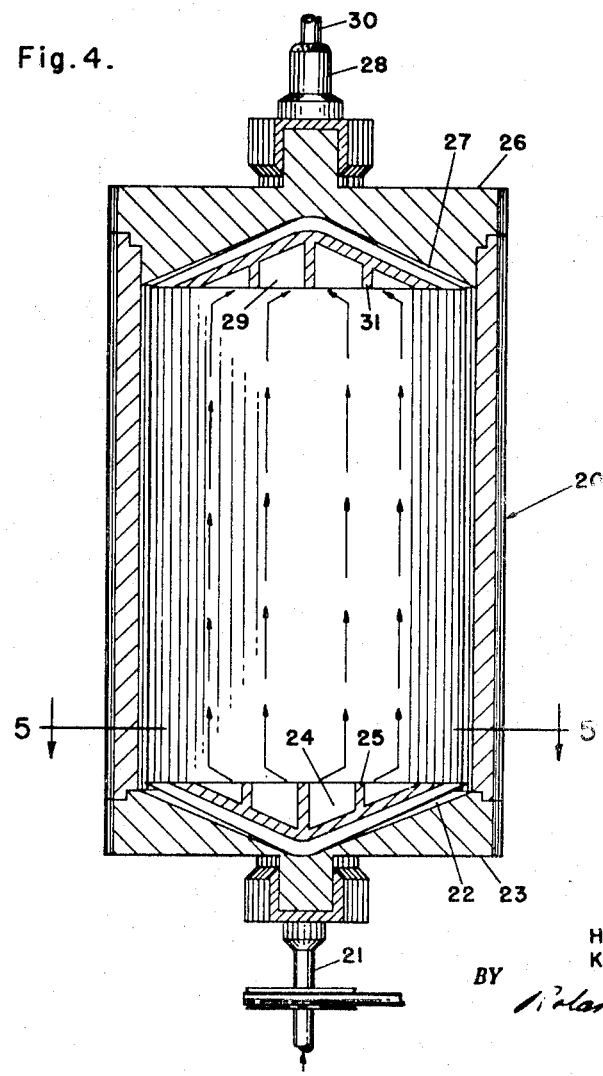
Fig. 4 is a sectional view taken vertically through still another form of centrifuge embodying the present invention.

Referring now to Figs. 4 and 5 of the drawings these figures show a centrifuge generally similar to the centrifuges of Figs. 1–3, but capable of establishing a flow pattern wherein the inner stream is a cylindrical stream filling the entire axial portion of the centrifuge. The gaseous mixture enters the centrifuge rotor 20 through the lower shaft 21 and a portion of the gas is conducted through the passages 22, which are formed in lower end cap 23 and are similar in construction to the passages 10 and 11b, to the periphery of the rotor 20. A second portion of the gaseous mixture flows thru a conical distributing passage 24 in end cap 23 to the central portion of rotor 20. The passage 24 is provided with a spider 25 to assist in obtaining proper distribution of the gas as it flows from shaft 21 to the interior of rotor 20.

From the lower end cap 23 the gas flows upwardly in two axial streams, a thin annular peripheral stream and a cylindrical stream filling the central portion of the rotor. At the upper end cap 26 the peripheral stream is conducted thru passages 27 to the upper outer shaft 28 and the central stream is conducted through the conical passage 29 to the upper inner shaft 30. The passage 29 may be provided with a spider 31 similar to the spider 25.

It is to be understood that the particular flow patterns discussed above are not the only patterns that may be used. The two streams may vary in radial thickness and may be of different shapes. It is only necessary that two fractions of the mixture be used and that these fractions be independently introduced into the centrifuge chamber and caused to flow in definite axial streams that are radially spaced from one another.

From the foregoing it will be observed that the present invention provides a centrifuge for separating gaseous mixtures and isotopic gaseous mixtures that is characterized by an optimum useful separative work per unit of rotor length, and while a particular embodiment of the invention has been illustrated and described herein, it is not intended that the invention be limited to such disclosure, but that changes and modifications may be made and incorporated herein within the spirit of the invention and the scope of the appended claim.

1. In a centrifuge for separating fluid mixtures, in combination, a rotatable rotor including a cylindrical separating chamber having opposite end walls and rotatable about an axis, first inlet means for said mixture formed in one end wall of said chamber near the periphery of said chamber, first outlet means for said mixture formed in the opposite end wall of said chamber near the periphery of said chamber, second inlet means for said mixture formed in one end wall of said chamber at a point spaced from the periphery of said chamber, and second outlet means for said mixture formed in the end wall of said chamber opposite said second inlet means, and spaced from the periphery of said chamber a distance equal to the distance between said second inlet port and the periphery of said chamber, said first and second outlet ports being in axial alinement with said first and second inlet ports respectively.

2. A centrifuge for separating gaseous mixtures, comprising a rotatable rotor including side and opposite end walls enclosing a separating chamber, a tubular inlet shaft secured coaxially of the rotational axis of the rotor in one end wall thereof, outer and inner inlet passages in said end wall for independently conducting separate streams of the mixtures therethrough, means for rotationally driving the rotor to produce therein a relative separation of the heavier and lighter components of the mixture, and tubular outlet shaft means arranged coaxially of the rotor in the other end wall thereof for withdrawing independently the respective separation fractions, said other end wall having therein an outer and an inner series of passages for conducting the heavier and lighter separations respectively to said outlet shaft means, said outer and inner series of passages being in axial alinement with said outer and inner inlet passages respectively, and said outer series of passages opening to the interior of the separating chamber at the periphery thereof and the said inner series of passages opening to the interior of said chamber a distance radially outward from the rotational axis of the rotor about 40% to 60% of the radial distance from said axis to the periphery of the rotor chamber.

3. A centrifuge for separating gaseous mixtures comprising a rotatable rotor including side and opposite end walls enclosing a separating chamber, a tubular inlet shaft secured coaxially of the rotational axis of the rotor in one end wall thereof, outer and inner inlet passages in said end wall for independently conducting separate streams of the mixtures therethrough, means for rotationally driving the rotor to produce therein a relative separation of the heavier and lighter components of the mixture, and tubular outlet shaft means arranged coaxially of the rotor in the other end wall thereof for withdrawing independently the respective separation fractions, said other end wall having therein an outer and an inner series of passages for conducting the heavier and lighter separations respectively to said outlet shaft means, said outer and inner series of passages being in axial alinement with said outer and inner inlet passages respectively, and said outer series of passages opening to the interior of the separating chamber at the periphery thereof and the said inner series of passages opening to the interior of said chamber a distance radially outward from the rotational axis of the rotor from 43% to 57% of the radial distance from said axis to the periphery of the rotor chamber.

4. A centrifuge for separating gaseous mixtures comprising a rotatable rotor including side and opposite end walls enclosing a separating chamber, a tubular inlet shaft secured coaxially of the rotational axis of the rotor in one end wall thereof, outer and inner inlet passages in said end wall for independently conducting separate streams of the mixtures therethrough, means for rotationally driving the rotor to produce therein a relative separation of the heavier and lighter components of the mixture, and tubular outlet shaft means arranged coaxially of the rotor in the other end wall thereof for withdrawing independently the respective separation fractions, said other end wall having therein an outer and an inner series of passages for conducting the heavier and lighter separations respectively to said outlet shaft means, said outer and inner series of passages being in axial alinement with said outer and inner inlet passages respectively, and said outer series of passages opening to the interior of the separating chamber at the periphery thereof and the said inner series of passages opening to the interior of said chamber a distance radially outward from the rotational axis of the rotor approximately 53% of the radial distance from said axis to the periphery of the rotor chamber.

5. A centrifuge for separating gaseous mixtures comprising a rotatable rotor including side and opposite end walls enclosing a separating chamber, a first inlet means formed in one end of said chamber near the periphery of said chamber and a first outlet means formed in the opposite end wall of said chamber near the periphery of said chamber, said first means having a radial width not exceeding 2.5 percent of the radial distance from the rotational axis of the centrifugal chamber to the periphery thereof, second inlet means formed in one end wall of said chamber at a point spaced from the periphery of said chamber and a second outlet means formed in the end wall of said chamber opposite said second inlet means, said second means having a radial width which does not exceed six percent of the radius of said centrifugal chamber and being spaced from the periphery of said chamber at a distance equal to the distance between said second inlet and the periphery of said chamber, said first and second outlet means having an axial alignment with said first and second inlet means respectively.

KARL COHEN.
HAROLD C. UREY.

REFERENCES CITED

The following references are of record in the file of this patent:

UNITED STATES PATENTS

| Number | Name | Date |
|---|---|---|
| 1,004,760 | Fetzer | Oct. 3, 1911 |
| 1,061,656 | Black | May 13, 1913 |
| 1,649,118 | Jones | Nov. 15, 1927 |

OTHER REFERENCES

Beams: "A Tubular Vacuum-Type Centrifuge," Review of Scientific Instruments, vol. 9, pp. 413–416 (1938). Copy in Scientific Library 233–1.

Beams et al.: "The Concentration of Isotopes by the Evaporative Centrifuge Method," Physical Review, vol. 56, pp. 266–272 (1939). Copy in Scientific Library.

Beams: "The Ultracentrifuge," Science in Progress, published 1940 by Yale University Press. Copy in Library of Congress. Pages 240–249 233–1.